(12) United States Patent
Steffen et al.

(10) Patent No.: US 9,371,784 B2
(45) Date of Patent: Jun. 21, 2016

(54) DUAL FUEL SYSTEM HAVING A DAMPER

(71) Applicant: Caterpillar Inc., Peoria, IL (US)

(72) Inventors: Joshua W. Steffen, El Paso, IL (US); Dana R. Coldren, E. Secor, IL (US)

(73) Assignee: Caterpillar Inc., Peoria, IL (US)

(*) Notice: Subject to any disclaimer, the term of this patent is extended or adjusted under 35 U.S.C. 154(b) by 625 days.

(21) Appl. No.: 13/725,161

(22) Filed: Dec. 21, 2012

(65) Prior Publication Data

US 2014/0174402 A1 Jun. 26, 2014

(51) Int. Cl.
| | |
|---|---|
| *F02M 21/02* | (2006.01) |
| *F02D 19/06* | (2006.01) |
| *B64C 27/51* | (2006.01) |
| *F02D 19/02* | (2006.01) |
| *F02M 37/00* | (2006.01) |

(52) U.S. Cl.
CPC ............ *F02D 19/06* (2013.01); *B64C 27/51* (2013.01); *F02D 19/024* (2013.01); *F02D 19/027* (2013.01); *F02M 37/0041* (2013.01); *Y02T 10/32* (2013.01); *Y02T 10/36* (2013.01)

(58) Field of Classification Search
CPC ..... F02D 19/06; F02D 19/024; F02D 19/027; F02M 2037/0005; F02M 37/0041; Y02T 10/32; B64C 27/51
USPC ......... 123/525, 431, 575, 457, 468, 510, 511, 123/515, 446
See application file for complete search history.

(56) References Cited

U.S. PATENT DOCUMENTS

| | | | | |
|---|---|---|---|---|
| 5,364,236 | A | * | 11/1994 | Herron et al. ............... 417/312 |
| 5,752,489 | A | * | 5/1998 | Henderson et al. ......... 123/494 |
| 6,213,096 | B1 | | 4/2001 | Kato et al. |
| 6,298,833 | B1 | * | 10/2001 | Douville et al. ............ 123/527 |
| 7,463,967 | B2 | | 12/2008 | Ancimer et al. |
| 8,028,676 | B2 | | 10/2011 | Ancimer et al. |
| 2008/0262701 | A1 | | 10/2008 | Williams et al. |
| 2010/0010727 | A1 | | 1/2010 | Cippitani |
| 2010/0268443 | A1 | | 10/2010 | Gurin et al. |

FOREIGN PATENT DOCUMENTS

EP 2 143 916 A1 1/2010

* cited by examiner

*Primary Examiner* — Hai Huynh
*Assistant Examiner* — Gonzalo Laguarda
(74) *Attorney, Agent, or Firm* — Finnegan, Henderson, Farabow, Garrett & Dunner, LLP; Joell R. Hibshman, II; John P. Wappel

(57) ABSTRACT

A dual fuel system for an engine is disclosed. The dual fuel system may have a first fuel supply providing a first fuel to the engine, and a second fuel supply providing a second fuel. The dual fuel system may also have a regulator configured to pass the second fuel from the second fuel supply to the engine, with the regulator also in fluid communication with the first fuel supply. The dual fuel system may further have a damper in fluid communication with the first fuel supply and an output of the regulator.

13 Claims, 4 Drawing Sheets

DUAL FUEL SYSTEM HAVING A DAMPER

TECHNICAL FIELD

The present disclosure is directed to a dual fuel system and, more particularly, to a dual fuel system having a damper.

BACKGROUND

Dual fuel systems supply the combustion chamber of an engine with two different types of fuel. In many cases, one of these fuels will be a liquid such as diesel fuel, and the other will be a gaseous fuel such as natural gas. Such systems often use a dome loaded regulator to control a pressure of the natural gas. This type of regulator is controlled by a reference pressure, for example, a pressure of the diesel fuel. By using a reference pressure, the engine can be supplied with each fuel in the proper pressure ratio.

However, the diesel fuel pressure is subject to fluctuations due to its incompressibility. Fuel pumps and fuel injectors can create fluctuations in this fuel pressure that would typically be passed on to the gaseous fuel pressure, since the diesel fuel pressure serves as the reference for the gaseous fuel pressure. Because the gaseous fuel's density is sensitive to these pressure fluctuations, engine operation may suffer as a result of the fluctuating pressures.

One attempt to address fuel system pressure fluctuations is described in U.S. Pat. No. 7,463,967 issued to Ancimer et al. on Dec. 9, 2008. The '967 patent describes a system that measures gaseous fuel pressure and adjusts fuel injection pulsewidth in order to correct for differences between a target fuel pressure and the measured fuel pressure. This system uses an engine map and calculations performed by an engine controller to modify the injector pulsewidth to a value that is calculated to provide the correct mass of fuel to the engine for a given engine parameter.

While the system of the '967 patent may provide some control over gaseous fuel pressure, it does so with sensors and a controller that are complex and require separate programming. Further, because the system of the '967 patent relies on electronic signals and calculations, there may be an increased potential for error, malfunction, and lag in the control system.

The present disclosure is directed toward one or more of the problems set forth above and/or other problems of the prior art.

SUMMARY OF THE INVENTION

In one aspect, the present disclosure is directed to a dual fuel system for an engine. The dual fuel system may include a first fuel supply providing a first fuel to the engine and a second fuel supply providing a second fuel. The dual fuel system may also include a regulator configured to pass the second fuel from the second fuel supply to the engine, with the regulator also in fluid communication with the first fuel supply. The dual fuel system may further include a damper in fluid communication with the first fuel supply and an output of the regulator.

In another aspect, the present disclosure is directed to a method of providing two fuels to an engine. The method may include directing a first fuel into the engine, and directing the first fuel to a regulator and to a damper in parallel. The method may further include directing a second fuel through the regulator into the engine and to the damper in parallel.

DETAILED DESCRIPTION

Figure 1:
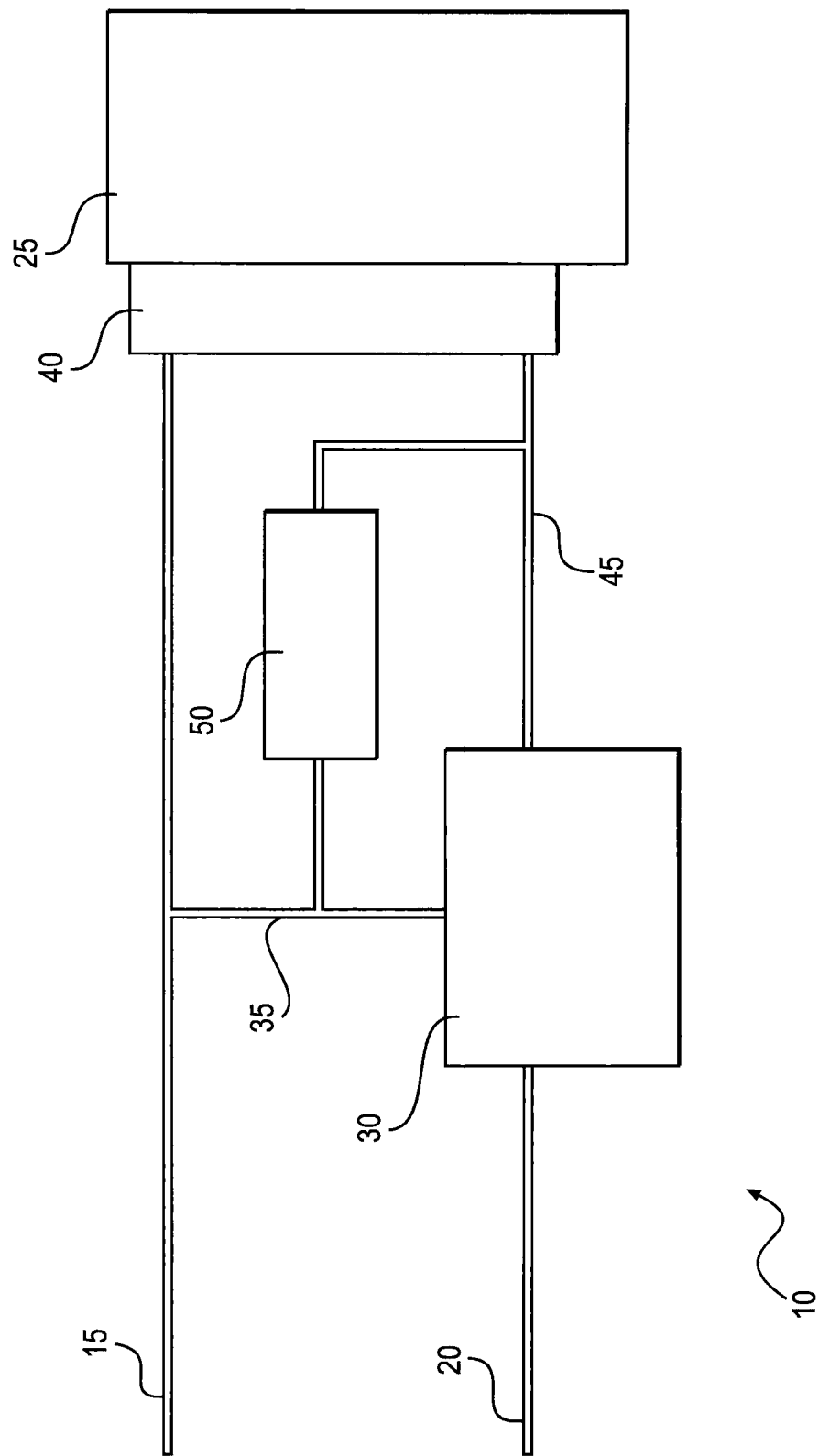
FIG. 1 is a diagrammatic illustration of an exemplary disclosed dual fuel system.

FIG. 1 illustrates an exemplary dual fuel system 10 having a first fuel supply 15 and a second fuel supply 20 that together fuel an engine 25. In the depicted example, the first fuel supply 15 contains diesel fuel, and the second fuel supply 20 contains natural gas (or another gaseous fuel). However, it is contemplated that other fuels such as biodiesel, liquefied petroleum gas, or hydrogen may also be used.

Engine 25 may take in air and the two fuels and ignite a mixture thereof. The resulting combustion generates mechanical work and exhaust gasses. The work can then be transferred from the engine to a machine such as a truck or generator in order to provide power to move a vehicle or generate electricity. After the combustion of the fuels, the byproducts are exhausted from the engine, and the cycle starts again.

Fuel system 10 is an important component of engine 25. Fuel must be delivered to engine 25 in order for combustion to occur and for power to be produced. Fuel system 10 may include a regulator 30 connected to first fuel supply 15 by a pilot line 35. Fuel supply 15 is also connected to an injector 40, which in turn is connected to engine 25. Second fuel supply 20 may be fed to engine 25 via regulator 30, regulator output 45, and injector 40. Regulator output 45 may feed into damper 50 on one side, and pilot line 35 may feed into damper 50 on an opposing side.

First fuel supply 15 may be a diesel fuel tank with a centrifugal pump located in the tank. Alternatively, first fuel supply 15 may be a diesel fuel tank with an in-line fuel pump disposed outside of the fuel tank. Second fuel supply 20 may be a tank of liquefied natural gas or other liquefied gaseous fuel. In order to maintain the fuel in a liquefied state the tank may be chilled, for example to below about −165 degrees Celsius (about −265 degrees Fahrenheit). In some embodiments, the liquefied gaseous fuel may be warmed and vaporized. Vaporization causes expansion and an increase in pressure that may result in no pump being needed. Alternatively, a pump may be employed. Even if second fuel supply 20 is natural gas in a gaseous state, the gas may be compressed in order to save space.

Regulator 30 may be a dome loaded regulator or another type known in the art. The pressure in pilot line 35 may be used as a reference pressure for regulating second fuel supply 20. Regulator output 45 may be maintained at a pressure that is substantially the same as or otherwise related to the pressure of pilot line 35. For example, the pressure of regulator output 45 may be regulated to be about 5 MPa lower than the pressure of pilot line 35.

Injector 40 may inject both gaseous and diesel fuels into engine 25. Injector 40 may be a series of injectors that inject both fuels, or it could be a series of injectors with each only injecting one type of fuel. Injector 40 may be connected to engine 25 at, for example, a cylinder head, such that the injection is directly into a combustion chamber of the engine. Alternatively, one or more of the injectors may be connected to the engine at the intake manifold to provide injection at an intake port.

Figure 2:
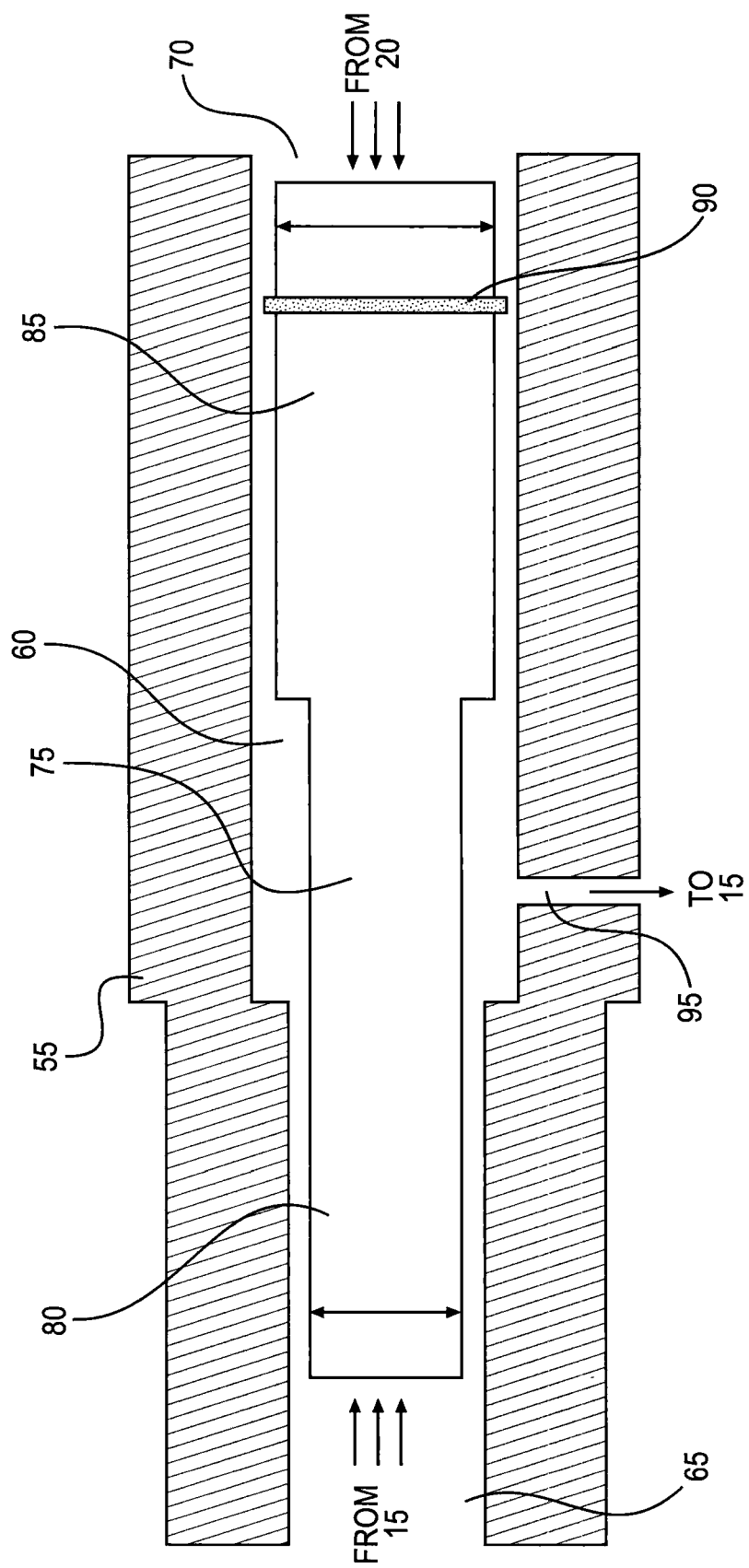
FIG. 2 is a cross sectional illustration of a damper that may be used in the dual fuel system of FIG. 1.

FIG. 2 illustrates an exemplary embodiment of damper 50. Damper 50 may have a housing 55 with a central bore 60 formed therein. Further, damper 50 may have a first port 65 at one end of central bore 60 that is connected to first fuel supply 15, and a second port 70 at the other end of central bore 60 that is connected to second fuel supply 20. Disposed between those ports may be piston 75. Piston 75 may have a first end 80 and a second end 85. The piston's first end 80 may be in contact with the fuel from pilot fuel line 35, and second end 85 may be in contact with the fuel from regulator output 45.

In the illustrated embodiment, a diameter of first end 80 may be smaller than a diameter of second end 85, such that a ratio of areas of the ends is about the same as a ratio of desired pressures of the fuels. By sizing the piston ends this way, the forces of the fuels on piston 75 may be balanced under normal conditions. When the force of one of the fuels on piston 75 is not balanced by the force of the other fuel, piston 75 may slide within central bore 60.

Damper 50 may further be structured to inhibit mixing of the fuels. A seal 90 may be disposed around the piston's second end 85. Seal 90 may be a nonmetallic annular seal suitable for being in contact with diesel fuel and natural gas, as well as for sliding in bore 60 without seizing or wearing down bore 60. A drainage port 95 may also be included in damper 50 and connected back to first fuel supply 15. Drainage port 95 may be located elsewhere on damper 50, as long as it is on the same side of seal 90 as first port 65.

Figure 3:
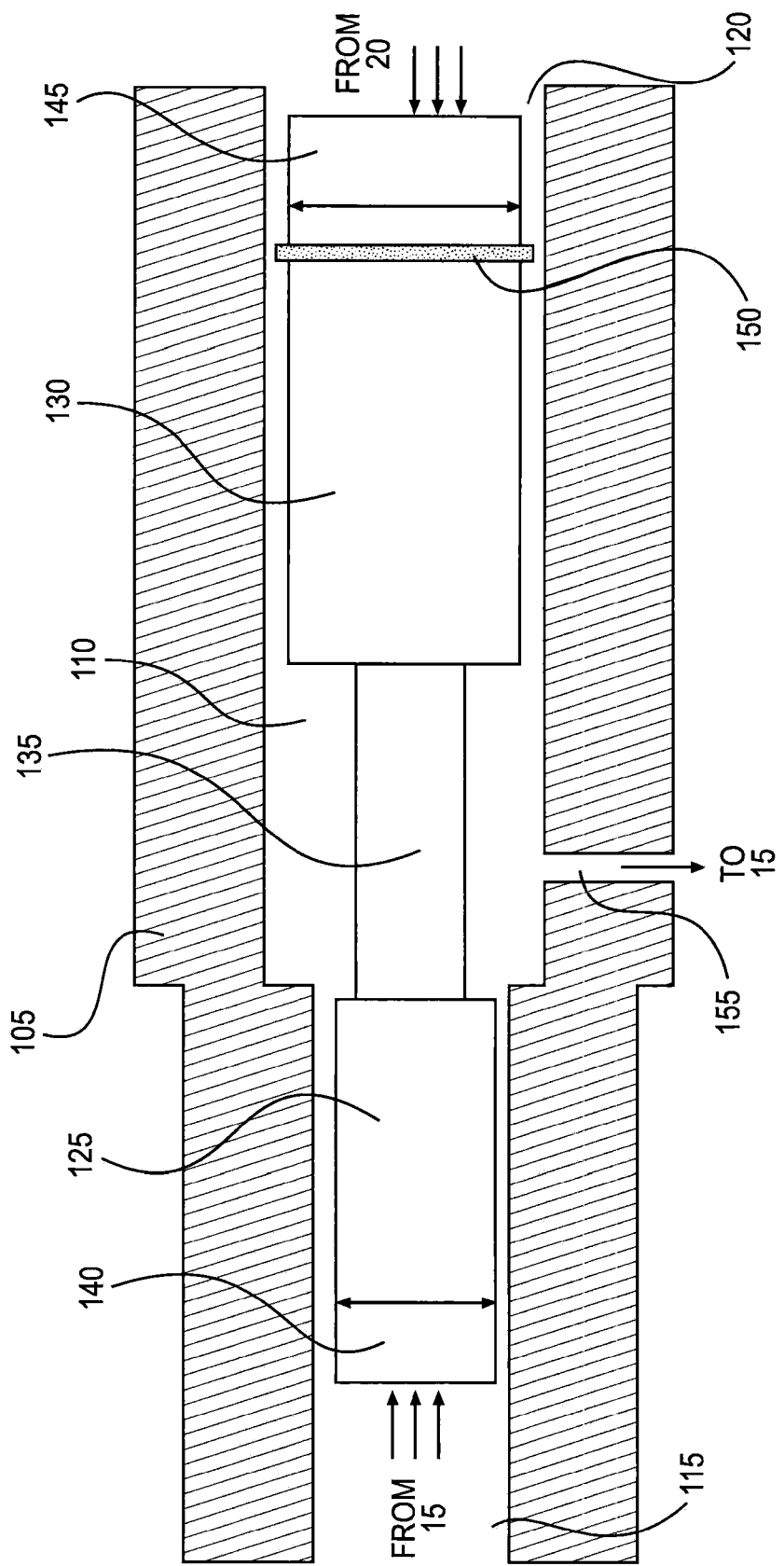
FIG. 3 is a cross sectional illustration of an alternative damper that may be used in the dual fuel system of FIG. 1.

FIG. 3 illustrates an alternative embodiment of a damper 100. As in the previous embodiment, damper 100 may have a housing 105 with a central bore 110 formed therein. Further, damper 50 may have a first port 115 at one end of central bore 110 that is connected to first fuel supply 15, and a second port 120 at an opposing end of central bore 110 that is connected to second fuel supply 20. Disposed between those ports may be a first piston 125, a second piston 130, and a rod 135 operatively connecting the pistons. A diameter of first piston 125 may be smaller than a diameter of second piston 130, but larger than a diameter of rod 135. First piston 125 may have a first end 140, and second piston 130 may have a second end 145. A seal 150 may be disposed around the second piston 130, and a drainage port 155 may be located in housing 105 between first piston 125 and seal 150 on the second piston 130.

Figure 4:
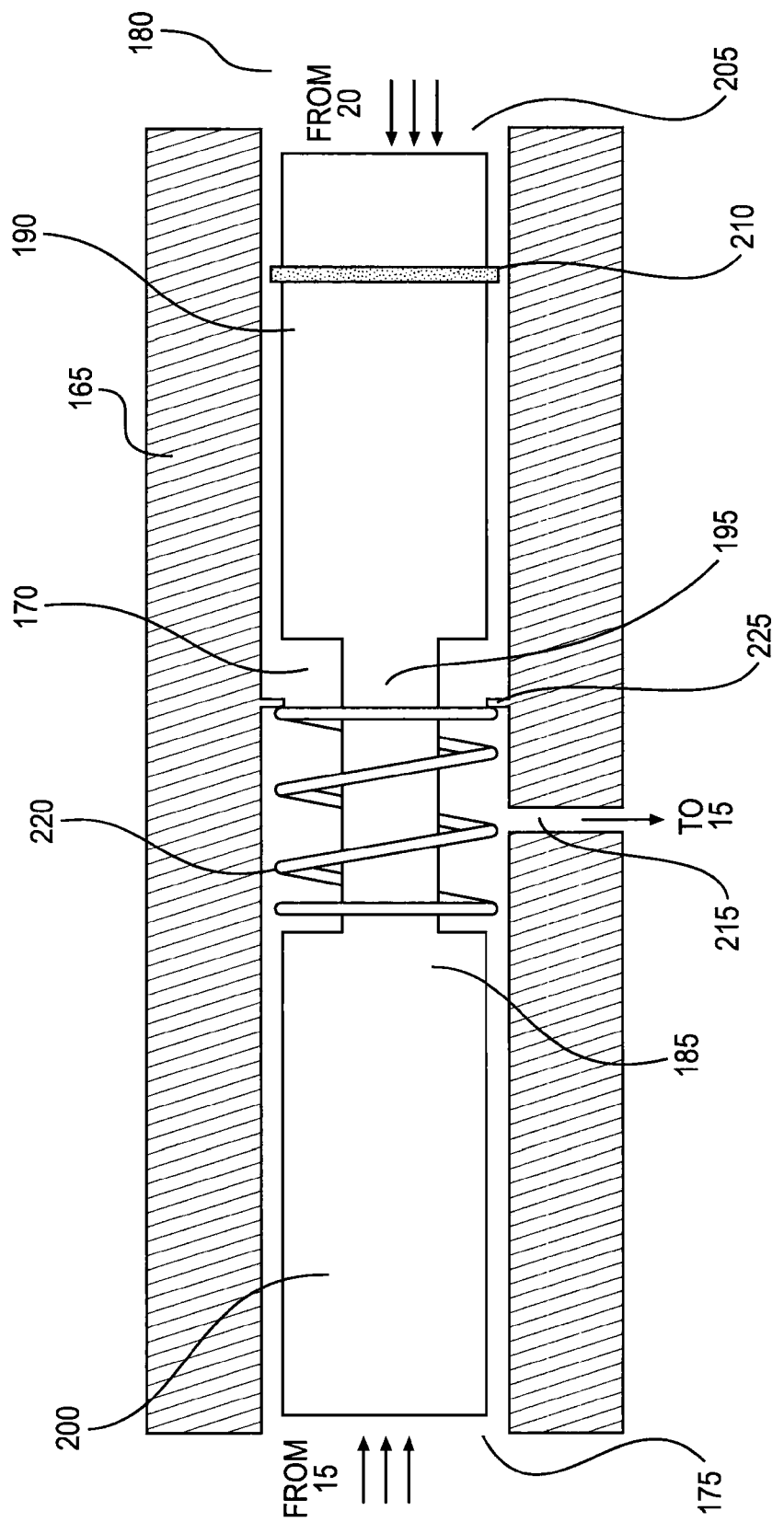
FIG. 4 is a cross sectional illustration of another alternative damper that may be used in the dual fuel system of FIG. 1.

FIG. 4 illustrates an alternative embodiment of a damper 160. As in the previous embodiments, damper 160 may have a housing 165 with a central bore 170 formed therein. Further, damper 160 may have a first port 175 at one end of central bore 170 that is connected to first fuel supply 15, and a second port 180 at an opposing end of central bore 170 that is connected to second fuel supply 20. Disposed between those ports may be a first piston 185, a second piston 190, and a rod 195 operatively connecting the pistons. First piston 185 may have a first end 200, and second piston 190 may have a second end 205. A seal 210 may be disposed around second piston 190, and a drainage port 215 may be located in housing 165 between first piston 185 and seal 210 on the second piston 190.

In this embodiment, first piston 185 and second piston 190 may have about the same area in contact with the fuels. To account for the pressure differential, damper 160 may include a spring 220 located between first piston 185 and a spring perch 225. This spring 220 may be calibrated to bias first and second pistons in a neutral position between two different fuel pressures until a pressure spike occurs.

INDUSTRIAL APPLICABILITY

The disclosed dual fuel system may be applicable to any dual fuel engine where improved fuel pressure control is desired. The system may provide for stability in the pressure of the second fuel through the use of a damper. The operation of dual fuel system 10 will now be described.

During operation of dual fuel system 10, first fuel supply 15 may be used to regulate the pressure of second fuel supply 20, and then both fuels may be directed into an engine 25. Second fuel supply 20 may be directed into regulator 30 to regulate its pressure before being fed to the injector 40. First fuel supply 15 may be directed to both the injector 40 and the regulator 30. Regulator 30 may use the first fuel supply's pressure as a reference pressure to modulate the pressure of the second fuel supply. Regulator output 45 and first fuel supply 15 may then be directed through injector 40 into engine 25.

Damper 50 may help to reduce the incidence of pressure variations in the first fuel supply 15 so that the regulator output 45 is more stable. Regulator output 45 may be directed into one side of damper 50, and first fuel supply 15 may be directed to an opposing side of damper 50. In the embodiment of FIG. 1, first fuel supply 15 is directed from pilot line 35 to damper 50, but other methods may be employed. Piston 75 of damper 50 may typically be balanced between the pressures of the different fuels, but when a pressure spike in the first fuel supply 15 is experienced, piston 75 may move to reduce the pressure spike.

As an example, diesel fuel from pilot line 35 may enter first port 65 at a pressure of about 40 MPa, while natural gas may enter second port 70 at a pressure of about 35 MPa. When first fuel supply 15 exhibits pressure variations, a pressure spike in pilot line 35 can result. When the pressure spike reaches the first end 80 of piston 75, the force of that pressure spike may be greater than the opposing force of the natural gas at second end 85 of piston 75. This imbalance of forces may cause piston 75 to move axially within central bore 60, which can help to reduce the pressure of the diesel fuel pressure spike in pilot line 35. When the pressure variation in the first fuel supply 15 subsides, piston 75 may return to its starting position by the natural gas pressure.

Seal 90, together with drainage port 95, may help to prevent the two fuels from mixing within damper 50. If the first fuel leaks past the first end 80 of piston 75, this leakage should be captured in drainage port 95 and returned to first fuel supply 15. Second fuel supply 20, which may be a gaseous or liquefied gaseous fuel, should be on an opposing side of seal 90 from drainage port 95 in order to prevent its escaping to the atmosphere. Unlike the liquid fuel of first fuel supply 15, which will remain in a liquid state and may be contained and returned to first fuel supply 15 without the use of pressurized lines, second fuel supply 20 may be a pressurized tank of a liquefied gaseous fuel. Because of its gaseous state, the second fuel may not be easily returned to second fuel supply 20 if it were to leak past second end 85 of the piston 75. Damper 100 and damper 160 may function similarly to damper 50.

After damping first fuel supply 15 and regulating second fuel supply 20, both fuels may then be directed into injector 40. Injector 40 may then inject the fuels into engine 25 by any suitable method known in the art. One such method may include directing both fuels to a dual fuel injector that injects both fuels through a single port. Another suitable method may include having separate diesel injectors and natural gas injectors.

The disclosed system may be used to provide two fuels to an engine at stable pressures for controlled combustion. The improved pressure stability may make the amount of fuel injected easier to control. With an easier to control fuel supply, proper air/fuel ratios may be more readily achieved. These ratios may allow for reduced emissions and increased fuel economy.

It will be apparent to those skilled in the art that various modifications and variations can be made to the disclosed dual fuel system. Other embodiments will be apparent to those skilled in the art from consideration of the specification and practice of the disclosed dual fuel system. It is intended that the specification and examples be considered as exemplary only, with a true scope being indicated by the following claims and their equivalents.

What is claimed is:

1. A dual fuel system for an engine, comprising:
    a first fuel supply providing a first fuel to the engine;
    a second fuel supply providing a second fuel;
    a regulator configured to pass the second fuel from the second fuel supply to the engine, the regulator also being in fluid communication with the first fuel supply; and
    a damper in fluid communication with the first fuel supply and an output of the regulator,
    the damper including at least one piston having a first end in contact with the first fuel and a second end in contact with the second fuel, and
    a diameter of the first end being smaller than a diameter of the second end.

2. The fuel system of claim 1, wherein the first and second ends of the at least one piston are sized to accommodate a pressure of the first fuel supply about 5 MPa higher than a pressure of the second fuel supply.

3. The fuel system of claim 1, wherein the damper further includes a seal disposed around the at least one piston.

4. The fuel system of claim 3, wherein the at least one piston includes:
    first and second pistons operatively connected together by a rod; and
    the first end of the at least one piston being associated with the first piston and the second end of the at least one piston being associated with the second piston.

5. The fuel system of claim 3 wherein:
    the first fuel is a liquid; and
    the second fuel is a gas.

6. The fuel system of claim 5 wherein the gas is natural gas.

7. The fuel system of claim 4, wherein the damper further includes a drainage port located between the first and second pistons and connected back to the first fuel supply.

8. The fuel system of claim 7, wherein the seal is disposed around the second piston.

9. The fuel system of claim 1, wherein the first and second ends of the at least one piston have the same diameter.

10. The fuel system of claim 9, wherein the at least one piston includes:
    first and second pistons operatively connected together by a rod; and
    the first end of the at least one piston being associated with the first piston and the second end of the at least one piston being associated with the second piston.

11. The fuel system of claim 10, wherein the damper further includes a spring to bias the at least one piston to a neutral position.

12. The fuel system of claim 1, further including a fuel injector configured to inject the first and second fuels into the engine.

13. A dual fuel system for an engine comprising:
    a supply of diesel fuel;
    a supply of natural gas;
    a regulator configured to pass natural gas from the supply of natural gas to the engine, the regulator also being in fluid communication with the supply of diesel fuel;
    at least one fuel injector configured to inject the diesel fuel and the natural gas into the engine; and
    a damper in fluid communication with the supply of diesel fuel and an output of the regulator, the damper including:
        a first piston having a first end in contact with the diesel fuel;
        a second piston having a second end in contact with the natural gas;
        a seal disposed around the second piston;
        a rod connecting the first and second pistons; and
        a drainage port located between the first and second pistons and connected back to the first supply,
    a diameter of the first end being smaller than a diameter of the second end, wherein the first and second ends are sized to allow a pressure of the diesel fuel to be about 5 MPa higher than a pressure of the natural gas.

* * * * *